(12) United States Patent
Kimba Dit Adamou et al.

(10) Patent No.: US 11,503,574 B2
(45) Date of Patent: Nov. 15, 2022

(54) INFORMATION INTERACTION METHOD AND TERMINAL

(71) Applicant: VIVO MOBILE COMMUNICATION CO., LTD., Guangdong (CN)

(72) Inventors: Boubacar Kimba Dit Adamou, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 16 days.

(21) Appl. No.: 16/953,222

(22) Filed: Nov. 19, 2020

(65) Prior Publication Data

US 2021/0076364 A1 Mar. 11, 2021

Related U.S. Application Data

(63) Continuation of application No. PCT/CN2019/088497, filed on May 27, 2019.

(30) Foreign Application Priority Data

May 31, 2018 (CN) .......................... 201810552770.5

(51) Int. Cl.
*H04W 56/00* (2009.01)
*H04W 72/04* (2009.01)
(Continued)

(52) U.S. Cl.
CPC ... *H04W 72/0406* (2013.01); *H04W 72/0446* (2013.01); *H04W 80/02* (2013.01); *H04W 84/042* (2013.01)

(58) Field of Classification Search
CPC ......... H04W 72/0406; H04W 72/0446; H04W 80/02; H04W 84/042
(Continued)

(56) References Cited

U.S. PATENT DOCUMENTS

2004/0229626 A1* 11/2004 Yi .......................... H04W 76/10
455/450
2011/0051609 A1 3/2011 Ishii
(Continued)

FOREIGN PATENT DOCUMENTS

| CN | 101841837 A | 9/2010 |
| CN | 105409290 A | 3/2016 |

(Continued)

OTHER PUBLICATIONS

Extended European Search Report dated Jun. 29, 2021 as received in Application No. 19812483.6.
(Continued)

*Primary Examiner* — Sai Ming Chan
(74) *Attorney, Agent, or Firm* — Maschoff Brennan

(57) ABSTRACT

An information interaction method and a terminal are provided. The method includes: transmitting a target message to a first network node, and recording first information associated with the first network node; if a response message from the first network node to the target message is not received within a preset time period, storing the first information and second information associated with the terminal; transmitting the first information and/or the second information to a second network node, wherein the second network node is a network node successfully accessed by the terminal.

20 Claims, 3 Drawing Sheets

(51) Int. Cl.
*H04W 80/02* (2009.01)
*H04W 84/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0083667 | A1 | 4/2013 | Persson et al. |
| 2013/0189973 | A1 | 7/2013 | Chang et al. |
| 2013/0315075 | A1 | 11/2013 | Tamura et al. |
| 2015/0133122 | A1 | 5/2015 | Chen |
| 2016/0127884 | A1 | 5/2016 | Kim et al. |
| 2016/0165473 | A1* | 6/2016 | Lin ................. H04W 76/18 370/252 |
| 2016/0219626 | A1 | 7/2016 | Martin |
| 2016/0261382 | A1 | 9/2016 | Vajapeyam |
| 2016/0374006 | A1 | 12/2016 | Chen |
| 2017/0245135 | A1* | 8/2017 | Park .................... H04W 8/06 |
| 2017/0331670 | A1* | 11/2017 | Parkvall ............. H04W 52/028 |
| 2018/0309754 | A1* | 10/2018 | Magadevan ......... H04L 63/126 |

FOREIGN PATENT DOCUMENTS

| | | |
|---|---|---|
| CN | 107690162 A | 2/2018 |
| JP | 2009055356 A | 3/2009 |
| JP | 2015122735 A | 7/2015 |
| JP | 2016526806 A | 9/2016 |
| JP | 2016534676 A | 11/2016 |
| JP | 2018512772 A | 5/2018 |
| WO | 2012111260 A1 | 8/2012 |
| WO | 2017/078785 A1 | 5/2017 |
| WO | 2017/118951 A1 | 7/2017 |

OTHER PUBLICATIONS

CN Office Action in Application No. 201810552770.5 dated Apr. 14, 2020.
Written Opinion and International Search Report in Application No. PCT/CN2019/088497 dated Dec. 10, 2020.
Japanese Office Action dated Jan. 4, 2022 as received in application No. 2020-564877.
Japanese Office Action dated May 23, 2022 as received in application No. 2020-564877.

* cited by examiner

INFORMATION INTERACTION METHOD AND TERMINAL

CROSS-REFERENCE TO RELATED APPLICATION

This application is a continuation application of International Application No. PCT/CN2019/088497 filed on May 27, 2019, which claims the priority of Chinese Application No. 201810552770.5, filed on May 31, 2018, which is incorporated herein by reference in their entireties.

TECHNICAL FIELD

The present disclosure relates to the field of communications technology, and in particular to an information interaction method and a terminal.

BACKGROUND

In the related art, an interaction process between a terminal and the network includes pieces of interaction information between the network and the terminal. Failure of interaction between the terminal and the network may be caused by that the terminal has not received a message transmitted by the network, or that the terminal has received a message transmitted by the network but connection or parsing is still unsuccessful, or other reasons. However, the network cannot know reasons for the interaction failure, nor can it know whether a certain interaction is successful.

SUMMARY

The present disclosure provides an information interaction method and a terminal, which can solve the problem in the related art that the network node cannot learn whether interaction failure occurs on the terminal and reasons for the interaction failure.

In order to solve the above technical problems, the present disclosure is implemented as follows. An information interaction method, operable by a terminal, includes:

transmitting a target message to a first network node, and recording first information associated with the first network node;

if a response message from the first network node to the target message is not received within a preset time period, storing the first information and second information associated with the terminal;

transmitting the first information and/or the second information to a second network node, wherein the second network node is a network node successfully accessed by the terminal.

One embodiment of the present disclosure further provides a terminal, including:

a transmitting-recording module configured to transmit a target message to a first network node, and record first information associated with the first network node;

a storage module configured to, if a response message from the first network node to the target message is not received within a preset time period, store the first information and second information associated with the terminal;

an information transmitting module configured to transmit the first information and/or the second information to a second network node, wherein the second network node is a network node successfully accessed by the terminal.

One embodiment of the present disclosure further provides a terminal, including: a processor, a memory, and a computer program stored on the memory and executable on the processor. The computer program is executed by the processor to implement steps of the foregoing information interaction method.

One embodiment of the present disclosure further provides a computer-readable storage medium, including: a computer program stored thereon. The computer program is executed by a processor to implement steps of the foregoing information interaction method.

In the embodiment of the present disclosure, the terminal records the first information after the target message is transmitted, and the terminal stores the first information and the second information after the interaction fails, and transmits the first information and/or the second information to a network node successfully accessed by the terminal, thereby enabling the network node to obtain the first information and/or the second information related to the interaction failure in time, to optimize the information interaction process according to the first information and/or the second information and improve the success rate of the information interaction.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments described in the present disclosure, and a person of ordinary skill in the art may still derive other drawings from these accompanying drawings without creative efforts.

DETAILED DESCRIPTION

The technical solutions in embodiments of the present disclosure will be described hereinafter in a clear manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
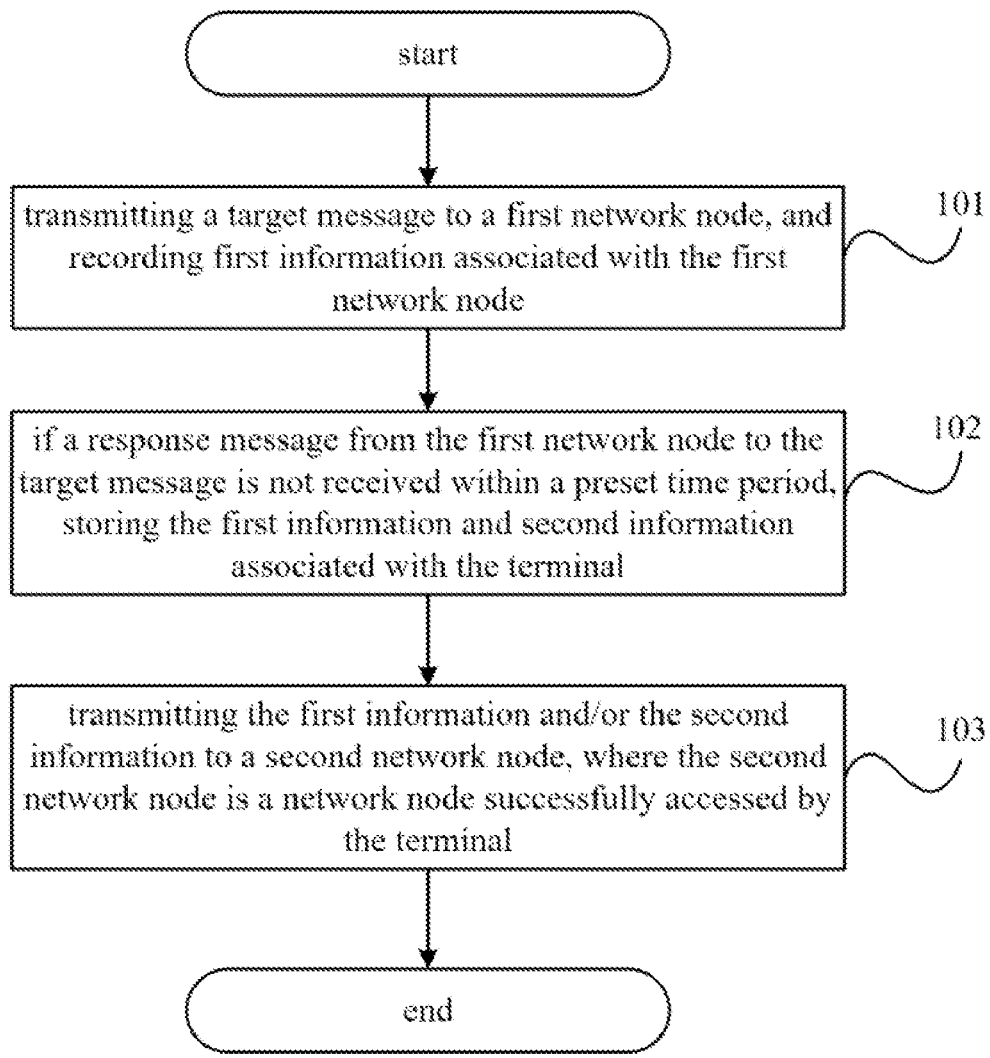
FIG. 1 is a flowchart of an information interaction method according to an embodiment of the present disclosure.

As shown in FIG. 1, one embodiment of the present disclosure provides an information interaction method, which is operable by a terminal and includes:

Step 101: transmitting a target message to a first network node, and recording first information associated with the first network node.

In this step, the target message is a message that requires a response from a network node, for example, a connection request message (the network node needs to feed back a connection request response message); for another example, a radio resource control (Radio Resource Control, RRC) reconfiguration complete message (the network needs to feed back a RRC reconfiguration completion response message) and so on, which will not be listed one by one here.

Step 102: if a response message from the first network node to the target message is not received within a preset time period, storing the first information and second information associated with the terminal.

In this step, if no response message is received within the preset time period, it indicates that interaction regarding the target message between the terminal and the first network node fails.

Step 103: transmitting the first information and/or the second information to a second network node, where the second network node is a network node successfully accessed by the terminal.

In this step, the first network node and the second network node are the same network node, or the first network node and the second network node are different network nodes.

It should be noted that in the case where an acquisition-recording network element is set on the network side, the second network node may also report the received first information and/or second information to the acquisition-recording network element, and then the acquisition-recording network element analyzes and optimizes the first information and/or the second information of multiple terminals, thereby improving a success rate of information interaction.

Further, in the foregoing embodiments of the present disclosure, the method further includes:

if the response message from the first network node to the target message is received within the preset time period, clearing the first information.

In this step, if the response message is received within the preset time period, it indicates that the interaction regarding the target message between the terminal and the first network node is successful. At this point, in order to save a storage space of the terminal, it is necessary to clear the first information previously recorded.

It should be noted that calculation of the preset time period may be implemented by a timer, that is, the timer is started after the terminal transmits the target message (a timing duration of the timer is a duration of the foregoing preset time period). If the terminal successfully receives the response message from the first network node when the timer does not expire, the terminal clears the first information (that is, the current information interaction is successful). If the terminal does not receive the response message from the first network node when the timer expires, the terminal stores the first information and the second information associated with the terminal (that is, the current information interaction is unsuccessful).

For example, the terminal transmits an RRC connection request. When the timer T>0, the terminal receives an RRC connection response issued by the first network node, then the terminal clears the first information recorded in the step 101 and stops the timer. When the timer T=0, the terminal has not received the RRC connection response issued by the first network node, that is, the connection is unsuccessful, then, the terminal stores the first information recorded in the step 101 and stores the second information associated with the terminal. Further, the terminal can restart the timer and try to initiate a connection request again.

Optionally, in the foregoing embodiment of the present disclosure, the first information includes at least one of the following information:

a message type of the target message; for example, the message type of the target message is an RRC connection request message;

identification information of an uplink carrying the target message;

identification information of an uplink carrier carrying the target message;

identification information of the first network node;

a network type of the first network node; for example, the network type may be: a long term evolution (Long Term Evolution, LTE), a new radio (New Radio, NR), etc., which are not listed here one by one;

a list of public land mobile networks (PLMNs) to which the first network node belongs;

a tracking area code of the first network node;

a radio access network area code (RAN Area Code, RANAC) of the first network node;

location information of the first network node; and, signal quality information of the first network node.

The 5G system introduces the concept of supplementary uplink (supplementary uplink, SUL). When the terminal uses a supplementary uplink, the terminal needs to report identification information of an uplink carrying the target message to the network node. The network node can learn that a message on which uplink has failed to interact. Further, different uplinks may use the same carrier or different carriers. In the case that different uplinks use different carriers, the terminal may report identification information of an uplink carrier carrying the target message to the network node, and network node can also learn that a message an uplink corresponding to which carrier has failed to interact.

Further, the signal quality information of the first network node includes at least one of the following information:

reference signal receiving power (Reference Signal Receiving Power, RSRP);

reference signal receiving quality (Reference Signal Receiving Quality, RSRQ);

signal to interference plus noise ratio (Signal to Interference plus Noise Ratio, SINR);

beam related information, such as synchronization signal block (SS block), primary synchronization signal (PSS), and secondary synchronization signal (SSS);

bandwidth part (BWP) information, such as BWP identification information;

basic service set identifier (basic service set identifier, BSSID);

received signal strength indicator (received signal strength indicator, RSSI);

power headroom (Power Headroom, PH);

RSRP, RSRQ, SINR, PSS, SSS, and related physical broadcast channel (PBCH) of the synchronization signal block (SS block), for example, measurement of PSS and SSS may include beam time index (beam time index); measurement of PBCH may include demodulation reference signal (Demodulation Reference Signal, DMRS) measurement and f related beam information;

RSRP, RSRQ and SINR measurement information of channel state information reference signal (CSI-RS); and, measurement information of a tracking reference signal (Tracking RS, TRS) or a phase-tracking reference signal (Phase-tracking RS, PTRS).

Further, in the foregoing embodiment of the present disclosure, the second information includes at least one of the following information:

media access control or medium access control (Media Access Control or Medium Access Control, MAC) parameters of the terminal;

radio link control (Radio Link Control, RLC) parameters of the terminal;

radio resource information used by the terminal when transmitting a target message, such as parameters of a signaling radio bearer (SRB) and a data radio bearer (DRB); and, the number of interaction failures between the terminal and the first network node; if a timer is used to monitor the preset time period, the number of interaction failures between the terminal and the first network node is specifically the number of times the timer expires.

Further, in the foregoing embodiment of the present disclosure, in a case where the second information includes a media access control (MAC) parameter of the terminal, the method further includes:

clearing an MAC entity.

In a case where the second information includes a radio link control (RLC) parameter of the terminal, the method further includes:

clearing an RLC entity.

In a case where the second information includes radio resource information used by the terminal when transmitting the target message, the method further includes:

clearing radio resources at which the target message is transmitted by the terminal, including a signaling radio bearer (Signaling Radio Bearer, SRB) and a data radio bearer (Data Radio Bearer, DRB).

Further, in the foregoing embodiment of the present disclosure, the interaction failure between the terminal and the first network node includes two cases, which include: a first case of connection failure between a terminal in an idle state (IDLE state) or in an inactive state (INACTIVE state) and the first network node; and a second case of communication failure between the terminal in a connected state and the first network node.

For example, when the terminal transmits a target message to the first network node, the terminal is in an idle state (IDLE state) or an inactive state (INACTIVE state). At this point, the target message is a message in a connection request process. In this case, the interaction failure between the terminal and the first network node is a connection failure, and then the target message includes:

random access channel (Random Access Channel, RACH) request message, such as MSG 1 (message 1); or, connection request message, such as MSG 3 (message 3); or, connection completion message and/or attach request message, such as MSG 5 (message 5).

For another example, when the terminal transmits a target message to the first network node, the terminal is in a connected state. At this point, the target message is a message transmitted by the connected terminal. In this case, the interaction failure between the terminal and the first network node is communication failure, and then the target message includes at least one of the following messages:

EPS mobility management (EPS Mobility Management, EMM) verification response message;

EMM security mode complete (EMM Security mode complete) message;

RRC security mode complete (RRC Security mode complete) message;

RRC reconfiguration completion message; and, non-access-stratum (Non-Access-Stratum, NAS) connection request message, such as an uplink direct transfer (UL Direct Transfer) and/or an attach complete (Attach Complete) message and/or an activate default EPS bearer context accept (activate default EPS bearer context accept) message and/or protocol data unit session (Protocol Data Unit session) message.

It should be noted that the foregoing specific limitation on the target message is only an optional embodiment of the present disclosure, and other messages transmitted by the connected terminal and requiring a response from the network node may be referred to as target messages, which are not listed here one by one.

Following the foregoing example, for the two cases of interaction failure, the timing of transmitting the first information and/or the second information in the embodiments of the present disclosure also includes two cases. Specifically, for the first case of connection failure, that is in the case where the target message is a connection request message transmitted by the terminal in an idle state or an inactive state, the information interaction method according to the embodiment of the present disclosure further includes:

when the terminal successfully accesses the second network node or after the terminal successfully accesses the second network node, transmitting the first information and/or the second information to the second network node.

In this case, the first network node and the second network node are the same network node, or the first network node and the second network node are different network nodes. The network types of the first network node and the second network node may be the same or different.

For example, if the terminal has an RRC connection failure on the LTE network, the terminal may report the first information and/or the second information to the LTE network, or may report the first information and/or the second information to the communication network such as 5G, WLAN or 3G, which is not specifically limited herein.

For another example, the terminal has an RRC connection failure at a network node 1 of a network 1; after the RRC connection failure, the terminal successfully accesses the network node 1 of the network 1. For another example, the terminal has an RRC connection failure at the network node 1 of the network 1; after the RRC connection failure, the UE successfully accesses a network node 1 of a network 2. For another example, the terminal has an RRC connection failure on the network 1; after the RRC connection failure, UE successfully accesses the network 2.

It should be noted that when the connection failure occurs between the terminal and the first network node, if the second network node and the first network node are different network nodes, then, after the second network node receives the first information and/or second information reported by the terminal, the second network node may further forward the first information and/or second information to the first network node, so that the first network node uses the first information and/or the second information to perform connection optimization.

Correspondingly, for the second case where the interaction failure is the communication failure, that is in the case where the target message is a message transmitted by the connected terminal, the information interaction method according to the embodiment of the present disclosure further includes:

transmitting the first information and/or the second information to the second network node at an end moment of the preset time period (also referred to as when the timer T=0); where the second network node and the first network node are the same network node.

It should be noted that, in order to reserve a time for uplink and downlink conversion for the terminal, the first information and/or the second information may also be transmitted to the second network node at any moment after the end moment of the preset time period (the moment may be set in advance). That is, there is a time interval between the moment when the first information and/or the second information is transmitted and the end moment of the preset time period, and the time interval may be set in advance, which is not specifically limited herein.

Further, in the foregoing embodiments of the present disclosure, the first information and/or the second information may be actively reported to the second network node by the terminal, or may be reported according to an instruction of the second network node. The method of actively reporting includes: when the terminal successfully accesses the second network node or after the terminal successfully accesses the second network node, actively transmitting, by the terminal, the first information and/or the second information to the second network node; or, at the end moment of the preset time period, actively transmitting, by the terminal, the first information and/or the second information to the second network node.

The method for reporting according to the instruction of the second network node specifically includes (that is, the step 103 includes):

transmitting first indication information to the second network node, where the first indication information is used to indicate that the terminal stores the first information and the second information;

receiving second indication information transmitted by the second network node, where the second indication information is used to instruct the terminal to report the first information and/or the second information;

reporting the first information and/or the second information to the second network node according to the second indication information.

The timing for transmitting the first indication information to the second network node includes: when the terminal successfully accesses the second network node, or after the terminal successfully accesses the second network node, or the end moment of the preset time period, or any moment after the end moment of the preset time period, which is not specifically limited herein. The first indication information may be included in an existing RRC message, such as MSG1, MSG3, MSG5; or, the terminal transmits the first indication information to the second network node through a dedicated signaling.

Optionally, the second indication information may be included in an existing RRC message, such as MSG2, MSG4, MSG6, for example, RRC reconfiguration message, RRC pause message, RRC release message, etc. Alternatively, the second network node transmits the second indication information to the terminal through a dedicated signaling.

In the process that the terminal reports the first information and/or the second information to the second network node according to the second indication information, the first information and/or the second information may be included in an existing RRC message, such as an RRC connection establishment message, RRC recovery message, RRC reconstruction message; or the terminal reports the first information and/or the second information to the second network node through a dedicated signaling.

In summary, in the foregoing embodiment of the present disclosure, the terminal records the first information after the target message is transmitted, and the terminal stores the first information and the second information after the interaction fails, and transmits the first information and/or the second information to a network node successfully accessed by the terminal, thereby enabling the network node to obtain the first information and/or the second information related to the interaction failure in time, to optimize the information interaction process according to the first information and/or the second information and improve the success rate of the information interaction.

Figure 2:
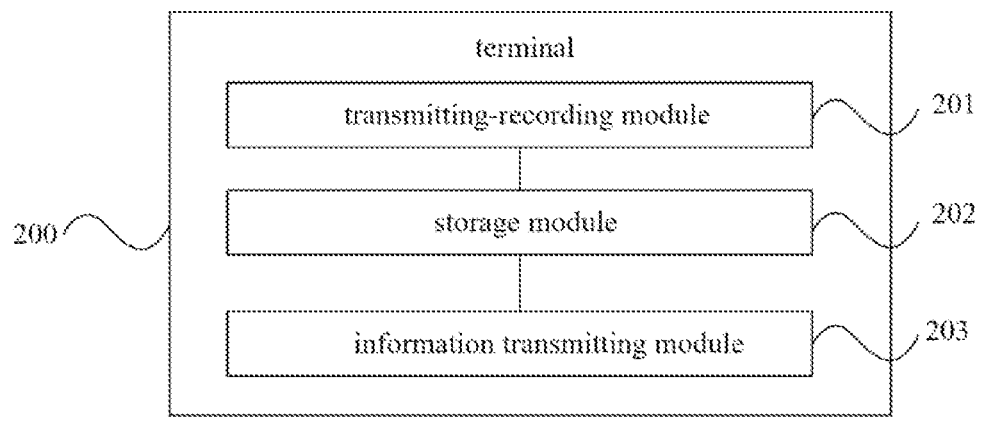
FIG. 2 is a first structural schematic diagram of a terminal according to an embodiment of the present disclosure.

As shown in FIG. 2, one embodiment of the present disclosure further provides a terminal 200, including:

a transmitting-recording module 201 configured to transmit a target message to a first network node, and record first information associated with the first network node;

a storage module 202 configured to, if a response message from the first network node to the target message is not received within a preset time period, store the first information and second information associated with the terminal;

an information transmitting module 203 configured to transmit the first information and/or the second information to a second network node, where the second network node is a network node successfully accessed by the terminal.

Optionally, in the foregoing embodiment of the present disclosure, the first network node and the second network node are the same network node, or the first network node and the second network node are different networks node.

Optionally, in the foregoing embodiments of the present disclosure, the terminal further includes:

an information clearing module configured to, if the response message from the first network node to the target message is received within the preset time period, clear the first information.

Optionally, in the foregoing embodiment of the present disclosure, the first information includes at least one of the following information:

a message type of the target message;
identification information of an uplink carrying the target message;
identification information of an uplink carrier carrying the target message;
identification information of the first network node;
a network type of the first network node;
a list of public land mobile networks (PLMNs) to which the first network node belongs;
a tracking area code of the first network node;
a radio access network area code of the first network node;
location information of the first network node; and,
signal quality information of the first network node.

Optionally, in the foregoing embodiment of the present disclosure, the second information includes at least one of the following information:

media access control (MAC) parameters of the terminal;
radio link control (Radio Link Control, RLC) parameters of the terminal;
radio resource information used by the terminal when transmitting a target message; and,
the number of interaction failures between the terminal and the first network node.

Optionally, in the foregoing embodiments of the present disclosure, the terminal further includes:

a first clearing module configured to clear an MAC entity when the second information includes a media access control (MAC) parameter of the terminal;

a second clearing module configured to clear an RLC entity when the second information includes a radio link control (RLC) parameter of the terminal;

a third clearing module configured to clear radio resources at which the target message is transmitted by the terminal, when the second information includes radio resource information used by the terminal when transmitting the target message.

Optionally, in the foregoing embodiment of the present disclosure, the information transmitting module 203 includes:

a first information transmitting sub-module, configured to, if the target message is a connection request message transmitted by the terminal in an idle state or an inactive state, when the terminal successfully accesses the second network node or after the terminal successfully accesses the second network node, transmit the first information and/or the second information to the second network node.

Optionally, in the foregoing embodiment of the present disclosure, the information transmitting module 203 includes:

a second information transmitting sub-module, configured to, when the target message is a message transmitted by the connected terminal, transmit the first information and/or the second information to the second network node at an end moment of the preset time period; where the second network node and the first network node are the same network node.

Optionally, in the foregoing embodiment of the present disclosure, the information transmitting module 203 includes:

a first transmitting sub-module configured to transmit first indication information to the second network node, where the first indication information is used to indicate that the terminal stores the first information and the second information;

a first receiving sub-module configured to receive second indication information transmitted by the second network node, where the second indication information is used to instruct the terminal to report the first information and/or the second information;

a third information transmitting sub-module configured to report the first information and/or the second information to the second network node according to the second indication information.

The terminal according to the embodiment of the present disclosure can implement processes implemented by the terminal in the method embodiment in FIG. 1. To avoid repetition, details are not described herein again.

In summary, in the foregoing embodiment of the present disclosure, the terminal records the first information after the target message is transmitted, and the terminal stores the first information and the second information after the interaction fails, and transmits the first information and/or the second information to a network node successfully accessed by the terminal, thereby enabling the network node to obtain the first information and/or the second information related to the interaction failure in time, to optimize the information interaction process according to the first information and/or the second information and improve the success rate of the information interaction.

It should be noted that, the terminals according to the foregoing embodiment of the present disclosure are terminals capable of executing the foregoing information interaction method, and all the embodiments of the foregoing information interaction method are applicable to the terminal with the same or similar beneficial effects being achieved.

Figure 3:
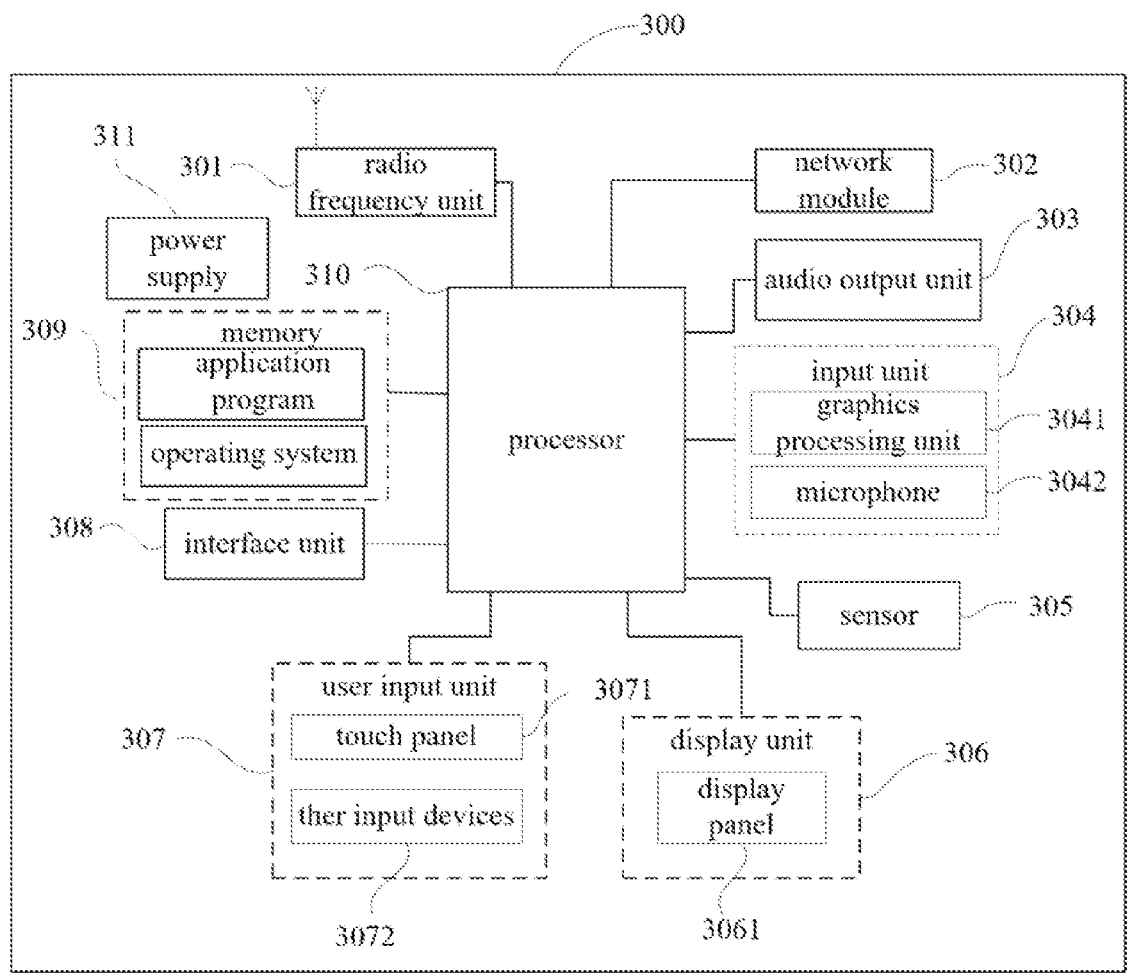
FIG. 3 is a second structural schematic diagram of a terminal according to an embodiment of the present disclosure.

FIG. 3 is a schematic structural diagram of hardware of a terminal for implementing each embodiment of the present disclosure. The terminal 300 includes, but not limited to, a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the terminal is not limited to the structure of the terminal shown in FIG. 3. The terminal may include more or fewer parts than that shown in the figure, or some parts may be combined, or an arrangement of parts may be different. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 301 is configured to transmit a target message to a first network node. The processor 310 is configured to record first information associated with the first network node. The processor 310 is further configured to, if a response message from the first network node to the target message is not received within a preset time period, store the first information and second information associated with the terminal. The radio frequency unit 301 is further configured to, transmit the first information and/or the second information to a second network node, where the second network node is a network node successfully accessed by the terminal.

In the foregoing embodiment of the present disclosure, the terminal records the first information after the target message is transmitted, and the terminal stores the first information and the second information after the interaction fails, and transmits the first information and/or the second information to a network node successfully accessed by the terminal, thereby enabling the network node to obtain the first information and/or the second information related to the interaction failure in time, to optimize the information interaction process according to the first information and/or the second information and improve the success rate of the information interaction.

It should be noted that, the terminals according to the foregoing embodiment of the present disclosure are terminals capable of executing the foregoing information interaction method, and all the embodiments of the foregoing information interaction method are applicable to the terminal with the same or similar beneficial effects being achieved.

It should be understood that in this embodiment of present disclosure, the radio frequency unit 301 may be configured to receive and send signals in an information reception or transmission or call process. Specifically, after receiving downlink data from a base station, the radio frequency unit 301 sends the downlink data to the processor 310 for processing. In addition, the radio frequency unit 301 sends uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with a network and another device by using a wireless communications system.

The terminal provides wireless broadband Internet access for a user by using the network module 302, for example, helps the user send and receive e-mails, browse web pages, and access streaming media.

The audio output unit 303 may convert audio data received by the radio frequency unit 301 or the network module 302 or audio data stored in the memory 309 into an audio signal, and output the audio signal as a sound. In addition, the audio output unit 303 may further provide an audio output (for example, a call signal reception sound or a message reception sound) related to a specific function performed by the terminal 300. The audio output unit 303 includes a speaker, a buzzer, a phone receiver, and the like.

The input unit 304 is configured to receive an audio or video signal. The input unit 304 may include a graphics processing unit (Graphics Processing Unit, GPU) 3041 and a microphone 3042. The graphics processing unit 3041 processes a still image or image data of a video obtained by an image capture apparatus (for example, a camera) in a video capture mode or an image capture mode. A processed image frame may be displayed on the display unit 306. The image frame processed by the graphics processing unit 3041 may be stored in the memory 309 (or another storage medium), or sent by the radio frequency unit 301 or the network module 302. The microphone 3042 may receive a sound, and can process the sound into audio data. The processed audio data may be converted in a phone call mode into a format that can be sent by the radio frequency unit 301 to a mobile communications base station for outputting.

The terminal 300 further includes at least one sensor 305, for example, a light sensor, a motion sensor, and other sensors. Specifically, the light sensor includes an ambient light sensor and a proximity sensor, where the ambient light sensor may adjust luminance of a display panel 3061 based on brightness of ambient light, and the proximity sensor may turn off and/or backlight the display panel 3061 when the terminal 300 moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the mobile terminal (such as switching between landscape and portrait, related games, and magnetometer posture calibration), implement vibration recognition related functions (such as a pedometer and stroke), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided for the user. The display unit 306 may include a display panel 3061. The display panel 3061 may be configured in a form of a liquid crystal display (Liquid Crystal Display, LCD), an organic light-emitting diode (Organic Light-Emitting Diode, OLED), or the like.

The user input unit 307 may be configured to receive input digit or character information, and generate a key signal input related to a user setting and function control of the mobile terminal. Specifically, the user input unit 307 includes a touch panel 3071 and other input devices 3072. The touch panel 3071, also referred to as a touchscreen, may capture a touch operation of the user on or near the touch panel (for example, an operation performed by the user by using any appropriate object or accessory such as a finger or a stylus on the touch panel 3071 or near the touch panel 3071). The touch panel 3071 may include two parts: a touch detection apparatus and a touch controller. The touch detection apparatus detects a touch direction of the user, detects a signal generated by the touch operation, and transmits the signal to the touch controller. The touch controller receives touch signal from the touch detection apparatus, converts the touch signal into touch point coordinates, transmits the touch point coordinates to the processor 310, receives a command transmitted by the processor 310, and executes the command In addition, the touch panel 3071 may be a resistive touch panel, a capacitive touch panel, an infrared touch panel, or a surface acoustic wave touch panel. In addition to the touch panel 3071, the user input unit 307 may further include the other input devices 3072. Specifically, the other input devices 3072 may include but are not limited to a physical keyboard, a function key (such as a volume control key or a power-on/off key), a trackball, a mouse, a joystick, and the like. Details are not described herein.

Further, the touch panel 3071 may cover the display panel 3061. When the touch panel 3071 detects a touch operation on or near the touch panel, the touch panel 3071 transmits the touch operation to the processor 310 to determine a type of a touch event. Then the processor 310 provides a corresponding visual output on the display panel 3061 based on the type of the touch event. Although the touch panel 3071 and the display panel 3061 are used as two independent components to implement input and output functions of the mobile terminal in FIG. 3, the touch panel 3071 and the display panel 3061 may be integrated to implement the input and output functions of the terminal in some embodiments. This is not specifically limited herein.

The interface unit 308 is an interface for connecting an external apparatus to the terminal 300. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 308 may be configured to receive an input (for example, data information or power) from the external apparatus, and transmit the received input to one or more components in the terminal 300, or may be configured to transmit data between the terminal and the external apparatus.

The memory 309 may be configured to store a software program and various types of data. The memory 309 may mainly include a program storage area and a data storage area. The program storage area may store an operating system, an application program required by at least one function (such as an audio playing function or an image playing function), or the like. The data storage area may store data (such as audio data or a phone book) that is created based on usage of the mobile phone, or the like. In addition, the memory 309 may include a high-speed random access memory, and may further include a non-volatile memory, for example, at least one magnetic disk storage device, a flash memory, or another non-volatile solid-state storage device.

The processor 310 is a control center of the terminal. The processor 310 uses various interfaces and lines to connect all parts of the entire terminal, and executes various functions and data processing of the terminal by running or executing the software program and/or module stored in the memory 309 and invoking data stored in the memory 309, thereby performing overall monitoring on the terminal. The processor 310 may include one or more processing units. Optionally, the processor 310 may integrate an application processor and a modem processor. The application processor mainly processes the operating system, a user interface, an application program, and the like. The modem processor mainly processes wireless communication. It may be understood that alternatively, the modem processor may not be integrated with the processor 310.

The terminal 300 may further include the power supply 311 (such as a battery) supplying power to each component. Optionally, the power supply 311 may be logically connected to the processor 310 by using a power management system, so that functions such as charge and discharge management and power consumption management are implemented by using the power management system.

In addition, the terminal 300 further includes some functional modules not shown, which are not described herein again.

Figure 4:
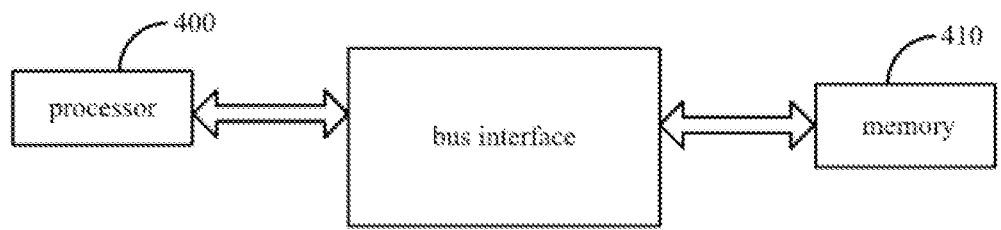
FIG. 4 is a third structural schematic diagram of a terminal according to an embodiment of the present disclosure.

Optionally, as shown in FIG. 4, one embodiment of the present disclosure further provides a terminal, including a processor 400, a memory 410, and a computer program that is stored in the memory 410 and can be run by the processor 400. When the computer program is executed by the processor 400, each process of the foregoing embodiment of the information interaction method is implemented, and a same technical effect can be achieved. Details are not described again herein to avoid repetition.

One embodiment of the present disclosure further provides a computer readable storage medium. The computer readable storage medium stores a computer program. The computer program is executed by a processor to implement process of the information interaction method in the foregoing embodiment with the same technical effect achieved. To avoid repetition, details are not described herein. The computer readable storage medium, may be, for example, a read-only memory (Read-Only Memory, ROM), a random access memory (Random Access Memory, RAM), a magnetic disk, or an optical disk.

It is to be understood that the terms such as "include" and "comprises" or their variations used in the specification are intended to encompass a non-exclusive inclusion, such that a process, method, article or device that include a series of elements include not only those elements but also other elements that are not explicitly listed, or elements that are inherent to such process, method, article, or device. Without more restrictions, an element defined by the sentence "including a . . . " does not exclude existence of other identical element in the process, method, article or device that includes the element.

Through the description of the above embodiments, those skilled in the art can clearly understand that the foregoing embodiment method can be implemented by means of software plus a necessary general hardware platform, and, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

The above are merely the optional embodiments of the present disclosure and shall not be used to limit the scope of the present disclosure. A person skilled in the art may make improvements and modifications without departing from the principle of the present disclosure, and these improvements and modifications shall also fall within the scope of the present disclosure. Therefore, the protection scope of the present disclosure should be determined by the scope of the claims.

What is claimed is:

1. An information interaction method, operable by a terminal, comprising:
    transmitting a target message to a first network node, and recording first information associated with the first network node;
    if a response message from the first network node to the target message is not received within a preset time period, storing the first information and second information associated with the terminal;
    transmitting the first information and/or the second information to a second network node, wherein the second network node is a network node successfully accessed by the terminal;
    wherein the step of transmitting the first information and/or the second information to a second network node, comprises:
    transmitting first indication information to the second network node, wherein the first indication information is used to indicate that the terminal stores the first information and/or the second information;
    receiving second indication information transmitted by the second network node, wherein the second indication information is used to instruct the terminal to report the first information and/or the second information;
    reporting the first information and/or the second information to the second network node according to the second indication information;
    wherein the second information comprises the number of interaction failures regarding the target message between the terminal and the first network node; and the target message is an RRC connection request message.

2. The method according to claim 1, wherein the first network node and the second network node are the same network node, or, the first network node and the second network node are different network nodes.

3. The method according to claim 1, further comprising:
    if the response message from the first network node to the target message is received within the preset time period, clearing the first information.

4. The method according to claim 1, wherein the first information comprises at least one of the following information:
    a message type of the target message;
    identification information of an uplink carrying the target message;
    identification information of an uplink carrier carrying the target message;
    identification information of the first network node;
    a network type of the first network node;
    a list of public land mobile networks (PLMNs) to which the first network node belongs;
    a tracking area code of the first network node;
    a radio access network area code of the first network node;
    location information of the first network node; and,
    signal quality information of the first network node.

5. The method according to claim 1, wherein the second information further comprises at least one of the following information:
    media access control (MAC) parameter of the terminal;
    radio link control (RLC) parameter of the terminal; and
    radio resource information used by the terminal when transmitting the target message.

6. The method according to claim 5, wherein when the second information comprises the MAC parameter of the terminal, the method further comprises: clearing an MAC entity;
when the second information comprises the RLC parameter of the terminal, the method further comprises: clearing an RLC entity;
when the second information comprises the radio resource information used by the terminal when transmitting the target message, the method further comprises: clearing radio resources at which the target message is transmitted by the terminal.

7. The method according to claim 1, wherein when the target message is a connection request message transmitted by the terminal in an idle state or an inactive state, the step of transmitting the first information and/or the second information to a second network node, comprises:
when the terminal successfully accesses the second network node or after the terminal successfully accesses the second network node, transmitting the first information and/or the second information to the second network node.

8. The method according to claim 1, wherein when the target message is a message transmitted by the terminal in a connected state, the step of transmitting the first information and/or the second information to a second network node, comprises:
transmitting the first information and/or the second information to the second network node at an end moment of the preset time period; wherein the second network node and the first network node are the same network node.

9. A terminal, comprising: a processor, a memory, and a computer program stored on the memory and executable on the processor; wherein the computer program is executed by the processor to,
transmit a target message to a first network node, and record first information associated with the first network node;
if a response message from the first network node to the target message is not received within a preset time period, store the first information and second information associated with the terminal;
transmit the first information and/or the second information to a second network node, wherein the second network node is a network node successfully accessed by the terminal;
wherein the processor is configured to,
transmit first indication information to the second network node, wherein the first indication information is used to indicate that the terminal stores the first information and/or the second information;
receive second indication information transmitted by the second network node, wherein the second indication information is used to instruct the terminal to report the first information and/or the second information;
report the first information and/or the second information to the second network node according to the second indication information;
wherein the second information comprises the number of interaction failures regarding the target message between the terminal and the first network node; and the target message is an RRC connection request message.

10. The terminal according to claim 9, wherein the first network node and the second network node are the same network node, or, the first network node and the second network node are different network nodes.

11. The terminal according to claim 9, wherein the processor is configured to,
if the response message from the first network node to the target message is received within the preset time period, clear the first information.

12. The terminal according to claim 9, wherein the first information comprises at least one of the following information:
a message type of the target message;
identification information of an uplink carrying the target message;
identification information of an uplink carrier carrying the target message;
identification information of the first network node;
a network type of the first network node;
a list of public land mobile networks (PLMNs) to which the first network node belongs;
a tracking area code of the first network node;
a radio access network area code of the first network node;
location information of the first network node; and,
signal quality information of the first network node.

13. The terminal according to claim 9, wherein the second information further comprises at least one of the following information:
media access control (MAC) parameter of the terminal;
radio link control (RLC) parameter of the terminal; and
radio resource information used by the terminal when transmitting the target message.

14. The terminal according to claim 13, wherein the processor is configured to,
clear an MAC entity when the second information comprises the MAC parameter of the terminal;
clear an RLC entity when the second information comprises the radio link control (RLC) parameter of the terminal;
clear radio resources at which the target message is transmitted by the terminal, when the second information comprises the radio resource information used by the terminal when transmitting the target message.

15. The terminal according to claim 9, wherein the processor is configured to,
if the target message is a connection request message transmitted by the terminal in an idle state or an inactive state, when the terminal successfully accesses the second network node or after the terminal successfully accesses the second network node, transmit the first information and/or the second information to the second network node.

16. The terminal according to claim 9, wherein the processor is configured to,
when the target message is a message transmitted by the connected terminal, transmit the first information and/or the second information to the second network node at an end moment of the preset time period; wherein the second network node and the first network node are the same network node.

17. A non-transitory computer-readable storage medium, comprising: a computer program stored thereon; wherein the computer program is executed by a processor to,
transmit a target message to a first network node, and record first information associated with the first network node;
if a response message from the first network node to the target message is not received within a preset time period, store the first information and second information associated with the terminal;

transmit the first information and/or the second information to a second network node, wherein the second network node is a network node successfully accessed by the terminal;

wherein the computer program is executed by the processor to, transmit first indication information to the second network node, wherein the first indication information is used to indicate that the terminal stores the first information and/or the second information;

receive second indication information transmitted by the second network node, wherein the second indication information is used to instruct the terminal to report the first information and/or the second information;

report the first information and/or the second information to the second network node according to the second indication information;

wherein the second information comprises the number of interaction failures regarding the target message between the terminal and the first network node; and the target message is an RRC connection request message.

18. The computer-readable storage medium according to claim 17, wherein the computer program is executed by the processor to, if the response message from the first network node to the target message is received within the preset time period, clear the first information.

19. The computer-readable storage medium according to claim 17, wherein the first information comprises at least one of the following information:

a message type of the target message;
identification information of an uplink carrying the target message;
identification information of an uplink carrier carrying the target message;
identification information of the first network node;
a network type of the first network node;
a list of public land mobile networks (PLMNs) to which the first network node belongs;
a tracking area code of the first network node;
a radio access network area code of the first network node;
location information of the first network node; and,
signal quality information of the first network node.

20. The computer-readable storage medium according to claim 17, wherein the second information further comprises at least one of the following information:

media access control (MAC) parameter of the terminal;
radio link control (RLC) parameter of the terminal; and
radio resource information used by the terminal when transmitting the target message.

* * * * *